United States Patent
Curtis et al.

(10) Patent No.: US 9,799,059 B1
(45) Date of Patent: Oct. 24, 2017

(54) SYSTEM AND METHOD FOR ADJUSTING THE USER COST ASSOCIATED WITH PURCHASABLE VIRTUAL ITEMS

(71) Applicant: KABAM, INC., San Francisco, CA (US)

(72) Inventors: Matthew Curtis, Novato, CA (US); Kellen Christopher Smalley, Pleasanton, CA (US); Christopher Pitz, San Francisco, CA (US); Michael C. Caldarone, Palo Alto, CA (US)

(73) Assignee: Aftershock Services, Inc., San Francisco, CA (US)

( * ) Notice: Subject to any disclaimer, the term of this patent is extended or adjusted under 35 U.S.C. 154(b) by 866 days.

(21) Appl. No.: 14/022,118

(22) Filed: Sep. 9, 2013

(51) Int. Cl.
*G06Q 30/00* (2012.01)
*G06Q 30/02* (2012.01)

(52) U.S. Cl.
CPC .............................. *G06Q 30/0283* (2013.01)

(58) Field of Classification Search
CPC .......................................... G06Q 30/06–30/08
USPC .............................................. 705/26.1–27.2
See application file for complete search history.

(56) References Cited

U.S. PATENT DOCUMENTS

| | | | |
|---|---|---|---|
| 5,933,813 A | 8/1999 | Teicher et al. | 705/26 |
| 5,964,660 A | 10/1999 | James et al. | 463/1 |
| 6,928,474 B2 | 8/2005 | Venkatesan | 709/224 |
| 7,076,453 B2 | 7/2006 | Jammes et al. | 705/26 |
| 7,533,336 B2 | 5/2009 | Jaffe et al. | 715/243 |
| 7,660,740 B2 | 2/2010 | Boone et al. | 705/26 |
| 7,682,239 B2 | 3/2010 | Friedman et al. | 463/16 |
| 8,016,668 B2 | 9/2011 | Hardy et al. | 463/29 |
| 8,050,976 B2 * | 11/2011 | Staib | G06Q 20/201 705/14.23 |
| 8,157,635 B2 | 4/2012 | Hardy et al. | 463/17 |
| 8,187,101 B2 | 5/2012 | Herrmann et al. | 463/42 |
| 8,226,472 B2 | 7/2012 | Van Luchene | 463/25 |
| 8,272,956 B2 | 9/2012 | Kelly et al. | 463/31 |
| 8,282,491 B2 | 10/2012 | Auterio et al. | 463/42 |
| 8,287,383 B1 | 10/2012 | Etter et al. | 463/42 |
| 8,287,384 B2 | 10/2012 | Auterio et al. | 463/42 |
| 8,292,743 B1 | 10/2012 | Etter et al. | 463/42 |

(Continued)

OTHER PUBLICATIONS

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/51 --14-29-Hamari,Lehdonvirta.pdf, on May 26, 2015, 16 pages.*

(Continued)

*Primary Examiner* — Ethan D Civan
(74) *Attorney, Agent, or Firm* — Sheppard Mullin Richter & Hampton LLP (57) ABSTRACT

A virtual space is provided to users via client computing devices where the user cost associated with purchasable virtual items may be adjusted. A game shop interface may be presented to users, comprising offers to purchase sets of one or more virtual items to the user. The associated user cost for the one or more sets of virtual items may be adjusted based upon a determination that the rate of purchase of and/or the revenue generated from the virtual items is more than a specified threshold from the average rate of purchase and/or average revenue generation rate.

20 Claims, 3 Drawing Sheets

(56) References Cited

U.S. PATENT DOCUMENTS

| | | | |
|---|---|---|---|
| 8,332,260 B1* | 12/2012 | Mysen | G06Q 10/00 380/231 |
| 8,348,767 B2 | 1/2013 | Mahajan et al. | 463/42 |
| 8,360,858 B2 | 1/2013 | LaRocca et al. | 463/25 |
| 8,360,867 B2 | 1/2013 | Van Luchene | 463/25 |
| 8,366,544 B2 | 2/2013 | Walker et al. | 463/29 |
| 8,401,913 B2 | 3/2013 | Alivandi | 705/26.1 |
| 8,777,754 B1 | 7/2014 | Santini | |
| 8,920,243 B1 | 12/2014 | Curtis et al. | 463/42 |
| 9,138,639 B1 | 9/2015 | Ernst | |
| 9,345,974 B1 | 5/2016 | Santini | |
| 2002/0095327 A1 | 7/2002 | Zumel et al. | 705/10 |
| 2003/0032476 A1 | 2/2003 | Walker et al. | 463/25 |
| 2003/0102625 A1 | 6/2003 | Katz et al. | 273/138.1 |
| 2004/0068451 A1 | 4/2004 | Lenk et al. | 705/28 |
| 2004/0215524 A1 | 10/2004 | Parkyn | 705/26 |
| 2004/0267611 A1 | 12/2004 | Hoerenz | 705/14 |
| 2005/0114223 A1 | 5/2005 | Schneider | 705/26 |
| 2008/0032787 A1 | 2/2008 | Low et al. | 463/29 |
| 2008/0154798 A1 | 6/2008 | Valz | 705/400 |
| 2008/0234043 A1 | 9/2008 | McCaskey et al. | 463/29 |
| 2008/0275786 A1 | 11/2008 | Gluck | 705/14 |
| 2009/0011812 A1 | 1/2009 | Katz et al. | 463/16 |
| 2009/0017886 A1 | 1/2009 | McGucken | 463/1 |
| 2009/0204907 A1 | 8/2009 | Finn et al. | 715/757 |
| 2009/0210301 A1 | 8/2009 | Porter et al. | 705/14 |
| 2009/0234710 A1 | 9/2009 | Belgaied Hassine et al. | 705/10 |
| 2009/0247282 A1 | 10/2009 | Cheng | |
| 2010/0050088 A1 | 2/2010 | Neustaedter et al. | 715/745 |
| 2010/0094841 A1 | 4/2010 | Bardwil | 707/705 |
| 2010/0174593 A1 | 7/2010 | Cao et al. | 705/14.12 |
| 2010/0198653 A1 | 8/2010 | Bromenshenkel et al. | 705/10 |
| 2010/0228606 A1 | 9/2010 | Walker et al. | 705/10 |
| 2010/0241491 A1 | 9/2010 | Eglen et al. | 705/10 |
| 2010/0241492 A1 | 9/2010 | Eglen et al. | 705/10 |
| 2011/0092273 A1 | 4/2011 | Cerbini | 463/25 |
| 2011/0113353 A1 | 5/2011 | Koh et al. | 715/760 |
| 2011/0145040 A1 | 6/2011 | Zahn et al. | 705/7.33 |
| 2011/0300923 A1 | 12/2011 | Van Luchene | 463/25 |
| 2012/0011002 A1 | 1/2012 | Crowe et al. | 705/14.66 |
| 2012/0040743 A1 | 2/2012 | Auterio et al. | 463/25 |
| 2012/0040761 A1 | 2/2012 | Auterio et al. | 463/25 |
| 2012/0042282 A1 | 2/2012 | Wong | 715/811 |
| 2012/0101886 A1 | 4/2012 | Subramanian et al. | 705/14.23 |
| 2012/0109785 A1 | 5/2012 | Karlsson | 705/27.1 |
| 2012/0130856 A1 | 5/2012 | Petri | |
| 2012/0142429 A1 | 6/2012 | Muller | 463/42 |
| 2012/0166380 A1 | 6/2012 | Sridharan et al. | 706/52 |
| 2012/0178529 A1 | 7/2012 | Collard et al. | 463/31 |
| 2012/0197874 A1 | 8/2012 | Zatkin et al. | 707/722 |
| 2012/0203669 A1 | 8/2012 | Borsch et al. | 705/27.1 |
| 2012/0215667 A1 | 8/2012 | Ganz et al. | 705/27.2 |
| 2012/0221430 A1 | 8/2012 | Naghmouchi et al. | 705/26.7 |
| 2012/0231891 A1 | 9/2012 | Watkins, Jr. et al. | |
| 2012/0245988 A1 | 9/2012 | Pace et al. | 705/14.25 |
| 2012/0289315 A1 | 11/2012 | Van Luchene | 463/25 |
| 2012/0289330 A1 | 11/2012 | Leydon et al. | 463/31 |
| 2012/0289346 A1 | 11/2012 | Van Luchene | 463/42 |
| 2012/0295699 A1 | 11/2012 | Reiche | 463/29 |
| 2012/0296716 A1 | 11/2012 | Barbeau et al. | 705/14.13 |
| 2012/0309504 A1 | 12/2012 | Isozaki | 463/25 |
| 2012/0330785 A1 | 12/2012 | Hamick et al. | 705/26.41 |
| 2013/0005466 A1 | 1/2013 | Mahajan | |
| 2013/0006736 A1 | 1/2013 | Bethke et al. | 705/14.12 |
| 2013/0012304 A1 | 1/2013 | Cartwright | 463/25 |
| 2013/0013459 A1 | 1/2013 | Kerr et al. | 705/27.1 |
| 2013/0090173 A1 | 4/2013 | Kislyi | 463/43 |
| 2013/0226733 A1 | 8/2013 | Evans | |
| 2014/0067544 A1 | 3/2014 | Klish et al. | 705/14.66 |
| 2014/0073420 A1 | 3/2014 | Matthew | |
| 2014/0089048 A1 | 3/2014 | Bruich | 705/7.32 |
| 2014/0100020 A1 | 4/2014 | Carroll | |
| 2014/0243072 A1 | 8/2014 | Santini et al. | 463/20 |

OTHER PUBLICATIONS

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store &oldid=396550>,<http://lotrowiki.com/index.php?title=Ouest:A_Little_Extra_Never_Hurts_--_Part_1 &oldid=399597> (28 pgs).

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2 &oldid=399366, http://lotro-wiki.com/index.php?title=Getting_Started&oldid=349681, Links are to used articles, 33 pages.

"Clash of Clans". Wikipedia.org. Online. Accessed via the Internet. Accessed Aug. 9, 2014. <URL: http://en.wikipedia.org/wiki/Clash_of_Clans>, 3 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-l-do->, Apr. 23, 2014, 9 pages.

"Gem calculation formulas". forum.supercell.net. Online. Accessed via the Internet. Accessed Aug. 9, 2014. <URL: http://forum.supercell.net/showthread.php/23028-Gem-calculation-formulas>, 3 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/ 5 pages.

UBC, "Theory of Auctions" available on Mar. 24, 2012 from https://web.archive.org/web/20120324204610/http://montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

(56) References Cited

OTHER PUBLICATIONS

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshot access date May 24, 2012 2:19 PM, 1 page.

"Behavioural Analytics & Campaigning", http://lotaris.com/behavioural_analytics_and_Compaigning.htm, screenshot access date May 24, 2012 2:21 PM, 1 page.

Aeria Games GmbH, "First Time Buyer—August", Aug. 10, 2010, <http://grandfantasia.aeriagames.com/news/5600/first-time-buyeraugust> (2 pgs).

Lotro-Wiki.com, "Hunting Lodge (Archet)" with "Introduction Quest", Aug. 14, 2012, https://lotrouwiki.com/index.php?title=Hunting_Lodge_(Archet)&oldid=495361 and <https://lotrowiki.com/index. php?title=Introduction_Quests&oldid=358308> (6 pages).

\* cited by examiner

SYSTEM AND METHOD FOR ADJUSTING THE USER COST ASSOCIATED WITH PURCHASABLE VIRTUAL ITEMS

FIELD OF THE DISCLOSURE

This disclosure relates to the user cost associated with virtual items, such as virtual items available for purchase in a game shop associated with a virtual space, and adjusting the user cost associated with the virtual items.

BACKGROUND

Many virtual environments and/or online games, provide users the opportunity and ability to make purchases of virtual items for use within the online game using real money, or virtual currency obtained with real money. Revenue may be generated for the operator of the virtual environment and/or online game through the purchase of virtual items by the users of the virtual environment and/or online game through a game shop, or virtual market place associated with the virtual environment and/or online game.

In some systems, the user cost associated with the virtual items has previously been set by administrators of the online game and users may purchase the virtual items at that administrator-set user cost. By setting a fixed user cost associated with the virtual items the operators of the online games fail to take advantage of the natural supply and demand economic system that occurs outside of the game environment, and therefore may fail to maximize revenue generation from the purchase, by users, of virtual items in the online game.

SUMMARY

One aspect of the disclosure relates to providing a virtual shop associated with a virtual game operating in a virtual space, wherein the virtual shop comprises one or more sets of virtual items for purchase by users of the virtual space. Users may purchase the one or more sets of virtual items with real currency, or, more typically, virtual currency purchased with real currency. Revenue generated from the purchase of virtual items in the virtual shop may go to the operator of the virtual space, allowing the operator to generate revenue.

Individual ones of the one or more sets of virtual items may have an associated user cost. Each set of virtual items may comprise one or more virtual items for purchase by users. The one or more virtual items may be stored in a user inventory and/or used within the virtual space. The associated user cost for the one or more sets of virtual items may be automatically adjusted based upon the demand for the individual ones of the one or more sets of virtual items. For example, in response to a determination that the demand for a first set of one or more virtual items has increased, the associated user cost of the first set of virtual items may be automatically increased by the system. Automatically increasing the associated user cost of virtual items having a relatively high demand compared to other virtual items, or compared with the demand of the virtual items during a previous time period, may increase the revenue generated from those virtual items, and do so without the need for intervention by administrators. Similarly, in response to a determination that the demand for the first set of virtual items has decreased, the associated user cost of the first set of virtual items may be decreased. Decreasing the associated user cost of the first set of virtual items may incentivize users to purchase the first set of virtual items and may, therefore, increase the revenue generated from the first set of virtual items.

Adjusting the user cost associated with the one or more sets of virtual items based on user demand may enhance revenue generation for the operator of the virtual space. Automatic adjustment of the user cost allows enhancement of revenue generation to occur without the need for administrator input, thereby reducing overhead for the operator of the virtual space, and ensuring a more efficient reaction to market conditions for virtual items within the virtual space.

The revenue generated from individual ones of the one or more sets of virtual items may be monitored over defined periods of time, and/or continuously. In response to the revenue from a first set of one or more virtual items reducing, the associated user cost of the first set of one or more virtual items may be reduced to incentivize users to purchase the first set of one or more virtual items, and therefore, increase the revenue from the first set of one or more virtual items. In response to the revenue from the first set of one or more virtual items increasing, the associated user cost of the first set of one or more virtual items may be increased to further increase the revenue from the first set of one or more virtual item. Subsequent to the associated user cost of the first set of one or more virtual item being increased, upon a determination that the revenue generated from the first set of one or more virtual item has decreased, the associated user cost for the first set of one or more virtual item may be reduced by a determined amount, reduced back to its original amount, or reduced to another amount.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The system configured to adjust the user cost associated with one or more purchasable virtual items may include one or more processors. The processor(s) may be configured to execute one or more computer program modules to provide an in-game offer to one or more players of an online game. The computer program modules may include one or more of a space module, a user module, a shop module, a purchase monitoring module, a cost adjustment module, a revenue monitoring module, an administrator module, and/or other modules. The processor(s) may be at the same location or may be at different locations. In some implementations, the client computing platforms may be configured to execute one or more computer program modules that are the same as or similar to the computer program modules of the server(s) to provide an in-game offer to one or more players of an online game.

The space module may be configured to execute an instance of a virtual space. The space module may be further configured to implement the instance of the virtual space to facilitate presentation of a view of the virtual space to users. The space module may be configured to facilitate interaction of the users with the virtual space by executing actions in the instance of the virtual space in response to receiving action requests from the users.

The shop module may be configured to facilitate presentation of a shop interface. The shop interface may be configured to present offers to purchase sets of one or more virtual items to the user. Individual ones of the sets of one or more virtual items may have an associated user cost, such that a first offer for a first set of one or more virtual items may have a first associated user cost.

The purchase monitoring module may be configured to obtain an average rate of purchase of individual ones of the sets of one or more virtual items by the users. For example, a first average rate of purchase by the users may be obtained for the first set of one or more virtual items. The average rate of purchase may be determined as the average rate over a continuous period of time, over one or more discrete periods of time, or over other periods of time. The time frame when determining the average rate of purchase may be adjusted to include and/or exclude certain time periods. For example, it may be determined that during a certain time period, such as a national holiday, or during school vacation periods, the average rate of purchase may be distorted. In such situations, the national holiday or the vacation period may be omitted from the time period used to determine the average rate of purchase.

The cost adjustment module may be configured to adjust the user cost associated with individual ones of the one or more sets of virtual items in response to a determination that the rate of purchase for individual ones of the one or more sets of virtual items is more than a specified threshold from the average rate of purchase of individual ones of the one or more sets of virtual items. The shop module may be configured to present a first offer for the first set of one or more virtual items having an adjusted user cost in response to a determination that the rate of purchase for the first set of one or more virtual items is more than a specified threshold from the first average rate of purchase for the first set of one or more virtual items.

The purchase monitoring module may be configured to monitor the rate of purchase of sets of one or more virtual items during defined periodic time intervals. For example, the rate of purchase of the first set of one or more virtual items may be monitored during a first periodic time interval. The purchase monitoring module may be configured to determine that the rate of purchase for the first set of one or more virtual items is more than a specified threshold from the first average rate of purchase for the first set of one or more virtual items. The specified threshold may be a statistical threshold, such as one or two standard deviations above the average rate of purchase for the first set of one or more virtual items. A rate of purchase above a specified threshold of the first average rate of purchase may indicate that the first set of one or more virtual item may have a greater demand among users of the virtual space.

The cost adjustment module may be configured to adjust the user cost associated with the first offer for the first set of one or more virtual items upon a determination that the rate of purchase during the first periodic time interval is more than a specified threshold from the first average rate of purchase for the first set of one or more virtual items. When items have a greater demand users of a virtual space may be willing to spend a greater amount to obtain the item compared to when the same items have a lower demand. Increasing the user cost associated with the first offer for the first set of one or more virtual items may increase the revenue generated by the first set of the one or more virtual items.

The revenue monitoring module may be configured to obtain an average revenue generation rate for the first set of one or more virtual items, such that a first average revenue generation rate is obtained for the first set of one or more virtual items, to determine revenue generation from purchases of the virtual items over a second period of time, in response to an adjustment of the associated user cost for the first set of one or more virtual items. For example, a second revenue generation rate may be determined for a first set of one or more virtual items. The revenue monitoring module may be configured to compare the second revenue generation rate for the first set of one or more virtual items with the first average revenue generation rate for the first set of one or more virtual items.

Increasing the user cost associated with the first set of one or more virtual items in response to a determination that the purchase rate of the one or more virtual items has increased may cause the users of the virtual space to collectively purchase less of the first set of one or more virtual items, which may, in turn, cause the revenue generated from the first set of one or more virtual items to reduce. In response to a determination that the second revenue generation rate for the first set of one or more virtual items is more than a specified threshold from the first average revenue generation rate for the first set of one or more virtual items, the cost adjustment module may be further configured to adjust the first user cost associated with the first set of one or more virtual items.

The specified threshold from the first average rate of purchase for the first set of one or more virtual item may be a specified number of standard deviations away from the average, such as two standard deviations from the average, a monetary value from the average, or other thresholds from the average. For example, in response to determining that the first rate of purchase for the first set of one or more virtual items is two standard deviations above the first average rate of purchase for the first set of one or more virtual items, the cost adjustment module may be configured to increase the associated first user cost for the first set of one or more virtual items, and in response to determining that the first rate of purchase for the first set of one or more virtual items is two standard deviations below the first average rate of purchase for the first set of one or more virtual items, the cost adjustment module may be configured to decrease the associated first user cost for the first set of one or more virtual items.

Users of the virtual space may be grouped based on one or more user parameters, such that a first group of users comprises one or more users having like parameters. Such parameters may include geographical location, gender, age, membership to social networking platforms, personality traits, game character traits, level attained within a game, amount of in-game purchases, or other parameters associated with users. The revenue monitoring module is further configured to obtain an average revenue generation rate for the first set of one or more virtual items, purchased by a first set of users comprising users having one or more like parameters. Determining the average revenue generation rate for users with like parameters allows the system to adjust the user cost associated with the one or more sets of virtual items on a portion of the users playing the game. For example, a first group of users may comprise users having a first geographical location and a second group of users may comprise users having a second geographical location. When the first geographic location has a time which is at a peak game-playing time, such as early evening, and the second geographic location may have a time which it as a low game-playing time, such as during the middle of the night. Adjusting the user cost associated with the first set of virtual items may have a different effect to the purchasing behavior of the first group of users compared to the second group of users. Adjusting the user cost associated with the first set of virtual items for the first set of users differently than the adjustment to the user cost associated with the first set of virtual items for the second set of users may further enhance revenue generation.

The administrator module may be configured to facilitate entry and/or selection by administrators of one or more rules for determining the average purchase rate of individual ones of the one or more sets of virtual items. For example, there may be periods of time where the virtual space has been unavailable to users and where no purchases of virtual items took place. Including this period in the determination of the average revenue generation rate may provide inaccurate values. The administrator module may be configured to facilitate entry and/or selection by administrators of one or more rules which cause this time period to be discounted in the determination of the average purchase rate of the virtual items. Other rules may include selecting one or more parameters to define one or more groups of users to target when determining the purchase rates of the virtual items by the one or more groups of users.

The administrator module may be configured to facilitate entry and/or selection by administrators of an adjustment to the adjusted first associated user cost for the first set of one or more virtual item. It may be desirable to set the user cost associated with one or more sets of virtual items at a level which would be different than that set by the cost adjustment module. For example, a very rare virtual item may not be purchased by many users, causing the system to reduce the cost of the item so that it generates revenue. Reducing the cost of rare virtual items within a game would make such items accessible to more users which may have an adverse effect on game play or the emotional investment of users in the virtual space. The administrator module may be configured to facilitate entry and/or selection of rules and/or commands to prevent the system from adjusting the cost of select ones of one or more sets of virtual items and/or facilitate entry and/or selection, by administrators, of user costs associated with select ones of one or more sets of virtual items. Alternatively, the administrator module may be configured to facilitate entry and/or selection by administrators of select ones of one or more virtual items to be subject to the system for adjusting the user cost associated with purchasable virtual items, and maintaining other sets of virtual items at the user cost set by administrators.

To avoid certain sets of virtual items from exceeding a value of other virtual items within the virtual space, and to maintain the game play experience and emotional investment of users within the virtual space it may be desirable to set a maximum user cost associated with certain sets of virtual items. The administrator module may be configured to facilitate entry and/or selection of a maximum associated user cost for one or more sets of one or more virtual items.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
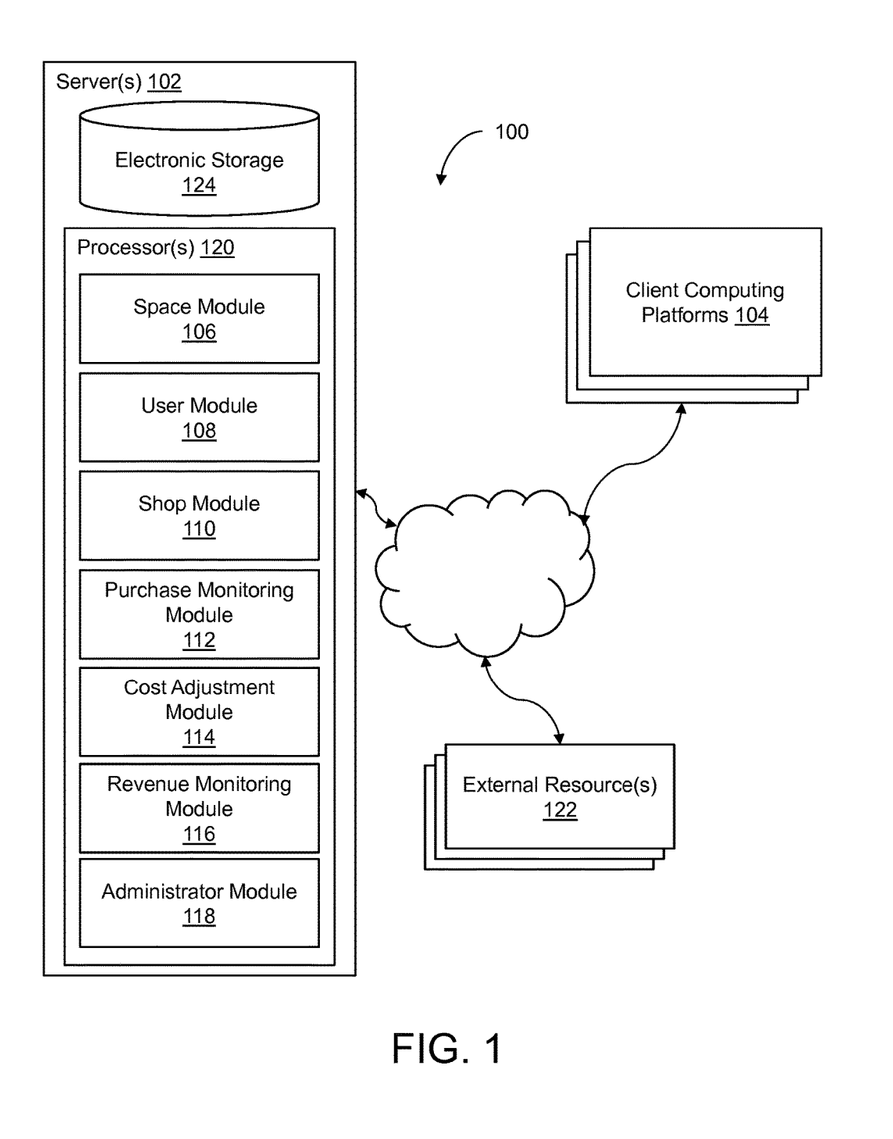
FIG. 1 illustrates a system configured to adjust the user cost associated with one or more purchasable virtual items.

FIG. 1 illustrates a system 100 configured to adjust the user cost associated with one or more purchasable virtual items. The system 100 may be configured to provide a virtual space to users. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104.

The server 102 may be configured to execute one or more computer program modules. The computer program modules may include one or more of a space module 106, a user module 108, a shop module 110, a purchase monitoring module 112, a cost adjustment module 114, a revenue monitoring module 116, an administrator module 118, and/or other modules. The server 102 may comprise one or more processors 120. The one or more processors 120 may be at the same location or may be at different locations. In some implementations, the client computing platforms 104 may be configured to execute one or more computer program modules that are the same as or similar to the computer program modules of the server(s) 102 to provide an in-game offer to one or more players of an online game.

The server 102, client computing platforms 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 122 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 122, and/or provide other functionality attributed herein to client computing platforms 104. By way of non-limiting example, the given client computing platform 404 may include one or more of a desktop computer, a laptop computer, a handheld computer, a tablet computing platform, a NetBook, a Smartphone, a gaming console, and/or other computing platforms.

The external resources 122 may include sources of information, hosts and/or providers of virtual environments outside of system 100, external entities participating with system 100, and/or other resources. In some implementations, some or all of the functionality attributed herein to external resources 122 may be provided by resources included in system 100.

The server 100 may include electronic storage 122, one or more processors 120, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 122 may comprise electronic storage media that electronically stores information. The electronic storage media of electronic storage 122 may include one or both of system storage that is provided integrally (i.e., substantially non-removable) with server 122 and/or removable storage that is removably connectable to server 122 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage xx may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114, 116, 118, and/or other modules. Processor 120 may be configured to execute modules 106, 108, 110, 112, 114, 116, 118, and/or other modules by software; hardware; firmware; some combination of software, hardware, and/or firmware; and/or other mechanisms for configuring processing capabilities on processor 120.

It should be appreciated that although 106, 108, 110, 112, 114, 116, and 118 are illustrated in FIG. 1 as being co-located within a single processing unit, in implementations in which processor 120 includes multiple processing units, one or more of modules 106, 108, 110, 112, 114, 116, 118, and/or other modules may be located remotely from the other modules. The description of the functionality provided by the different modules 106, 108, 110, 112, 114, 116, 118, and/or other modules described below is for illustrative purposes, and is not intended to be limiting, as any of modules 106, 108, 110, 112, 114, 116, 118, and/or other modules may provide more or less functionality than is described. For example, one or more of modules 106, 108, 110, 112, 114, 116, 118, and/or other modules may be eliminated, and some or all of its functionality may be provided by other ones of 106, 108, 110, 112, 114, 116, 118, and/or other modules. As another example, processor 120 may be configured to execute one or more additional modules that may perform some or all of the functionality attributed below to one of modules 106, 108, 110, 112, 114, 116, 118, and/or other modules.

The space module 106 may be configured to implement the instance of the virtual space executed by the computer modules to determine state of the virtual space. The state may then be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 106 is not intended to be limiting. The space module 106 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space. Such virtual goods stored in the inventory of the user may include one or more sets of one or more virtual items purchased by the user from the virtual store and/or marketplace, facilitated by the shop module 110.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 106).

The user module 108 may be configured to access and/or manage one or more user profiles and/or user information associated with users of the system 102. The one or more user profiles and/or user information may include information stored by server 102, one or more of the client computing platforms 104, and/or other storage locations, such as at external resource(s) 122. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The virtual space, virtual game, and/or users of the virtual space and/or game, may have one or more electronic social media interactions. Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

The system 100 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by monitoring the interactions of the users may be stored to the user profiles managed by user module 108.

At a given time, the system 100 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or taking some other action indicating ongoing and contemporaneous engagement with the virtual space.

The system 100 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Figure 2:
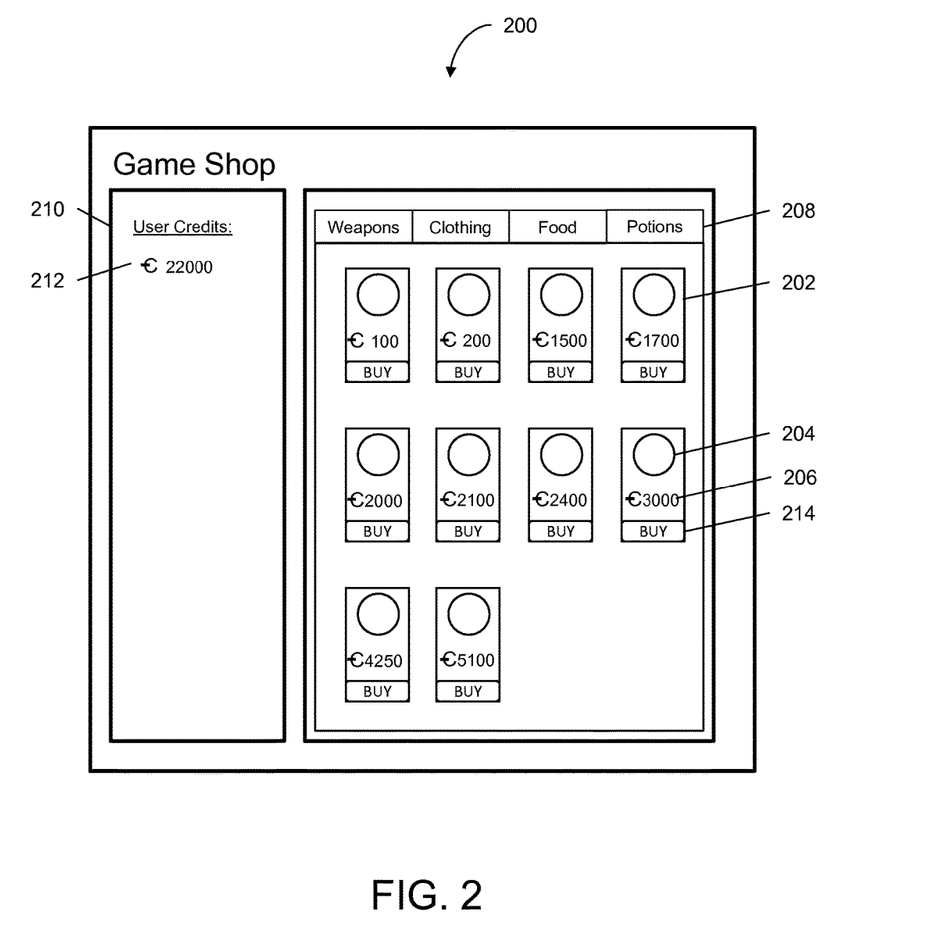
FIG. 2 illustrates an exemplary embodiment of a virtual shop.

The shop module 110 may be configured to facilitate presentation of a shop interface. FIG. 2 illustrates an exemplary embodiment of a virtual shop. The shop interface 200 may be configured to present offers 202 to purchase sets of one or more virtual items 204 to the user. Individual ones of the sets of one or more virtual items 204 may have an associated user cost 206, such that a first offer for a first set of one or more virtual items may have a first associated user cost.

The shop interface 200 may comprise one or more virtual item categories 208. The sets of one or more virtual items 204 may be categorized based upon one or more characteristics of the one or more virtual items 204 into categories. Such categories may relate to elements of the virtual game and/or environment, such as weapons, clothing, food, potions, furniture, and other categories. The game interface 200 may also include user information 210 providing information to the user on how much virtual currency 212 the user has to spend in the game shop.

The game interface 200 may facilitate purchase of the sets of one or more virtual items 204. The game interface 200 may include an electronic button 214 configured to facilitate entry and/or selection by the user of an instruction to purchase the set of one or more virtual items 204. Upon an entry and/or selection by the user of an indication that the user wishes to purchase the set of one or more virtual items, indicated by the user interacting with electronic button 214, the set of one or more virtual items may appear in the user's inventory. Additionally, the user's virtual currency 212, held in credit for the user, may be reduced by an amount corresponding to the user cost 206 associated with the set of the one or more virtual items 204.

The purchase monitoring module 112 may be configured obtain an average rate of purchase of individual ones of the sets of one or more virtual items by the users. For example, a first average rate of purchase by the users may be obtained for the first set of one or more virtual items. The average rate of purchase may be determined as the average rate over a continuous period of time, over one or more discrete periods of time, or over other periods of time. The time frame when determining the average rate of purchase may be adjusted to include and/or exclude certain time periods. For example, it may be determined that during a certain time period, such as a national holiday, or during school vacation periods, the average rate of purchase may be distorted. In such situations, the national holiday or the vacation period may be omitted from the time period used to determine the average rate of purchase.

The cost adjustment module 114 may be configured to adjust the user cost associated with individual ones of the one or more sets of virtual items in response to a determination that the rate of purchase for individual ones of the one or more sets of virtual items is more than a specified threshold from the average rate of purchase of individual ones of the one or more sets of virtual items. With reference to FIG. 2, the shop module 110 may be configured to present a first offer 202 for the first set of one or more virtual items 204 having an adjusted user cost 206 in response to a determination that the rate of purchase for the first set of one or more virtual items 204 is more than a specified threshold from the first average rate of purchase for the first set of one or more virtual items 204.

The purchase monitoring module 112 may be configured to monitor the rate of purchase of sets of one or more virtual items during defined periodic time intervals. For example, the rate of purchase of the first set of one or more virtual items may be monitored during a first periodic time interval. The purchase monitoring module 112 may be configured to determine that the rate of purchase for the first set of one or more virtual items is more than a specified threshold from the first average rate of purchase for the first set of one or more virtual items. The specified threshold may be a statistical threshold, such as one or two standard deviations above the average rate of purchase for the first set of one or more virtual items. A rate of purchase above a specified threshold of the first average rate of purchase may indicate that the first set of one or more virtual item may have a greater demand among users of the virtual space.

The cost adjustment module 114 may be configured to adjust the user cost associated with the first offer for the first set of one or more virtual items upon a determination that the rate of purchase during the first periodic time interval is more than a specified threshold from the first average rate of purchase for the first set of one or more virtual items. When items have a greater demand, users of a virtual space may be willing to spend a greater amount to obtain the item compared to when the same items have a lower demand. Increasing the user cost associated with the first offer for the first set of one or more virtual items may increase the revenue generated by the first set of the one or more virtual items.

The revenue monitoring module 116 may be configured to obtain an average revenue generation rate for the first set of one or more virtual items, such that a first average revenue generation rate is obtained for the first set of one or more virtual items, to determine revenue generation from purchases of the virtual items over a second period of time, in response to an adjustment of the associated user cost for the first set of one or more virtual items. For example, a second revenue generation rate may be determined for a first set of one or more virtual items. The revenue monitoring module 116 may be configured to compare the second revenue generation rate for the first set of one or more virtual items with the first average revenue generation rate for the first set of one or more virtual items.

Increasing the user cost associated with the first set of one or more virtual items in response to a determination that the purchase rate of the one or more virtual items has increased may cause the users of the virtual space to collectively purchase less of the first set of one or more virtual items, which may, in turn, cause the revenue generated from the first set of one or more virtual items to reduce. In response to a determination that the second revenue generation rate for the first set of one or more virtual items is more than a specified threshold from the first average revenue generation rate for the first set of one or more virtual items, the cost adjustment module 114 may be further configured to adjust the first user cost associated with the first set of one or more virtual items.

The specified threshold from the first average rate of purchase for the first set of one or more virtual item may be a specified number of standard deviations away from the average, such as two standard deviations from the average, a monetary value from the average, or other thresholds from the average. For example, in response to determining that the first rate of purchase for the first set of one or more virtual items is two standard deviations above the first average rate of purchase for the first set of one or more virtual items, the cost adjustment module 114 may be configured to increase the associated first user cost for the first set of one or more virtual items, and in response to determining that the first rate of purchase for the first set of one or more virtual items is two standard deviations below the first average rate of purchase for the first set of one or more virtual items, the cost adjustment module 114 may be configured to decrease the associated first user cost for the first set of one or more virtual items.

Users of the virtual space may be grouped based on one or more user parameters, such that a first group of users comprises one or more users having like parameters. Such parameters may include geographical location, gender, age, membership to social networking platforms, personality traits, game character traits, level attained within a game, amount of in-game purchases, or other parameters associated with users. The revenue monitoring module 116 may be further configured to obtain an average revenue generation rate for the first set of one or more virtual items, purchased by a first set of users comprising users having one or more like parameters. Determining the average revenue generation rate for users with like parameters allows the system to adjust the user cost associated with the one or more sets of virtual items on a portion of the users playing the game. For example, a first group of users may comprise users having a first geographical location and a second group of users may comprise users having a second geographical location. When the first geographic location has a time which is at a peak game-playing time, such as early evening, and the second geographic location may have a time which it as a low game-playing time, such as during the middle of the night. Adjusting the user cost associated with the first set of virtual items may have a different effect to the purchasing behavior of the first group of users compared to the second group of users. Adjusting the user cost associated with the first set of virtual items for the first set of users differently than the adjustment to the user cost associated with the first set of virtual items for the second set of users may further enhance revenue generation.

The administrator module 118 may be configured to facilitate entry and/or selection by administrators of one or more rules for determining the average purchase rate of individual ones of the one or more sets of virtual items. For example, there may be periods of time where the virtual space has been unavailable to users and where no purchases of virtual items took place. Including this period in the determination of the average revenue generation rate may provide inaccurate values. The administrator module 118 may be configured to facilitate entry and/or selection by administrators of one or more rules which cause this time period to be discounted in the determination of the average purchase rate of the virtual items. Other rules may include selecting one or more parameters to define one or more groups of users to target when determining the purchase rates of the virtual items by the one or more groups of users.

The administrator module 118 may be configured to facilitate entry and/or selection by administrators of an adjustment to the adjusted first associated user cost for the first set of one or more virtual item. It may be desirable to set the user cost associated with one or more sets of virtual items at a level which would be different than that set by the cost adjustment module 114. For example, a very rate virtual item may not be purchased by many users, causing the system to reduce the cost of the item so that it generates revenue. Reducing the cost of rare virtual items within a game would make such items accessible to more users which may have an adverse effect on game play or the emotional investment of users in the virtual space. The administrator module 118 may be configured to facilitate entry and/or selection of rules and/or commands to prevent the system from adjusting the cost of select ones of one or more sets of virtual items and/or facilitate entry and/or selection, by administrators, of user costs associated with select ones of one or more sets of virtual items. Alternatively, the administrator module 118 may be configured to facilitate entry and/or selection by administrators of select ones of one or more virtual items to be subject to the system for adjusting the user cost associated with purchasable virtual items, and maintaining other sets of virtual items at the user cost set by administrators.

To avoid certain sets of virtual items from exceeding a value of other virtual items within the virtual space, and to maintain the game play experience and emotional investment of users within the virtual space it may be desirable to set a maximum user cost associated with certain sets of virtual items. The administrator module 118 may be configured to facilitate entry and/or selection of a maximum associated user cost for one or more sets of one or more virtual items.

Figure 3:
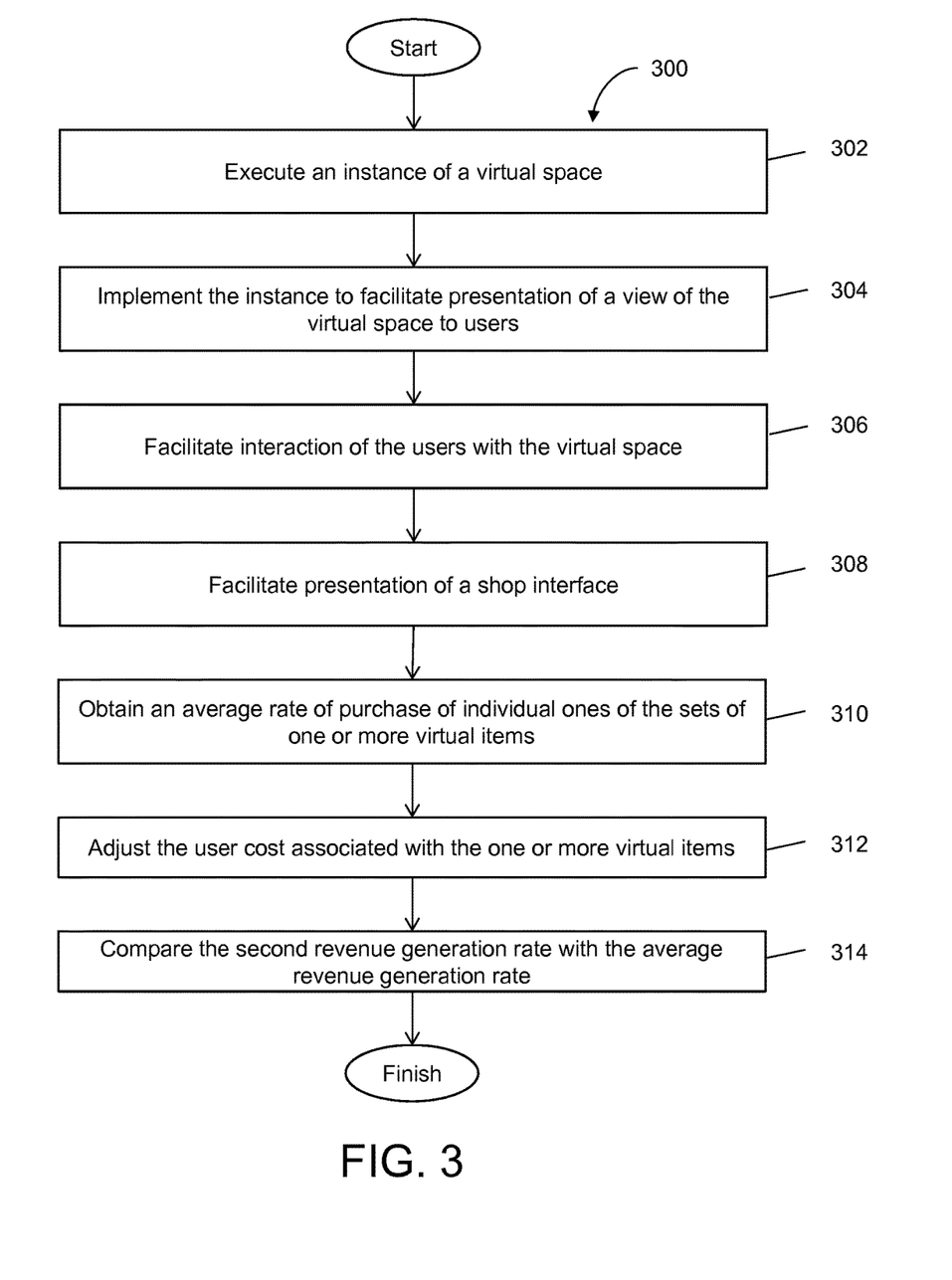
FIG. 3 illustrates a method for adjusting the user cost associated with one or more purchasable virtual items.

FIG. 3 illustrates a method 300 for adjusting the user cost associated with purchasable virtual items of hosting a virtual space to client computing devices for interaction by users. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed. Operation 302 may be performed by a space module that is the same as or similar to space module 106, in accordance with one or more implementations.

At an operation 304, the instance may be implemented to facilitate presentation of a view of the virtual space to users. Operation 304 may be performed by a space module that is the same as or similar to space module 106, in accordance with one or more implementations.

At an operation 306, interaction of the users with the virtual space may be facilitated by executing actions in the instance of the virtual space in response to receiving action requests from the users. Operation 306 may be performed by a space module that is the same as or similar to space module 106, in accordance with one or more implementations.

At an operation 308, presentation of a shop interface may be facilitated. The shop interface may present offers to purchase sets of one or more virtual items to the user where individual ones of the sets of one or more virtual items has associated user costs, such that a first offer for a first set of one or more virtual items has a first associated user cost. Operation 308 may be performed by a shop module that is the same as or similar to shop module 110, in accordance with one or more implementations.

At an operation 310, an average rate of purchase of individual ones of the sets of one or more virtual items by the users may be obtained. For example, a first average rate of purchase by the users may be obtained for the first set of one or more virtual items. Operation 310 may be performed by a purchase monitoring module that is the same as or similar to purchase monitoring module 112, in accordance with one or more implementations.

At an operation 312, the user cost associated with individual ones of the one or more sets of virtual items may be adjusted in response to a determination that the rate of purchase is more than a specified threshold from the average rate of purchase of individual ones of the one or more sets of virtual items. For example, the first offer for the first set of one or more virtual items may have an adjusted user cost associated in response to a determination that the rate of purchase for the first set of one or more virtual items is more than a specified threshold from the first average rate of purchase for the first set of one or more virtual items. Operation 312 may be performed by a cost adjustment module 114 that is the same as or similar to cost adjustment module 114, in accordance with one or more implementations.

In some implementations, at operation 310, the rate of purchase of sets of one or more virtual items may be monitored during defined periodic time intervals. For example, the rate of purchase of the first set of one or more virtual items may be monitored during a first periodic time interval. Further, at operation 312, the user cost associated with the first offer for the set first set of one or more virtual items may be adjusted upon a determination that the rate of purchase during the first periodic time interval, as obtained at an operation 310, is more than a specified threshold from the first average rate of purchase for the first set of one or more virtual items.

In some implementations, in addition to or instead of performing the functions of operation 310, an average revenue generation rate for individual ones of the sets of one or more virtual items may be obtained, such that a first average revenue generation rate may be obtained for the first set of one or more virtual items. Additionally, a revenue generation rate from purchases of individual ones of the sets of one or more virtual items over a second period of time in response to an adjustment of the associated user cost for the individual ones of the sets of one or more virtual items may be determined. For example, a second revenue generation rate may be determined for the first set of one or more virtual items over the second period of time in response to the user cost associated with the first set of one or more virtual items being adjusted. Such operations may be performed by a revenue monitoring module, such as revenue monitoring module 116, in accordance with some implementations.

At an operation 314, the second revenue generation rate may be compared with the first average revenue generate rate for individual ones of the sets of one or more virtual items, such that the second revenue generation rate may be compared with the first average revenue generation rate for the first set of one or more virtual items. Operation 314 may be performed by a revenue monitoring module, such as revenue monitoring module 116, in accordance with some implementations.

In some implementations, an average revenue generation rate may be obtained, in addition to or in place of operation 310, for the first set of one or more virtual items, purchased by a first set of users comprising users having one or more like parameters. At an operation 314, the first user cost associated with the first set of one or more virtual items for the first set of users may be adjusted in response to determining the revenue generation rate for the first set of one or more virtual items purchased by the first set of users.

In response to a determination that the first revenue generation rate for the first set of one or more virtual items is more than a specified threshold from the first average revenue generation rate for the first set of one or more virtual items, as determined at an operation 314, the first user cost associated with the first set of one or more virtual items may be adjusted. The first user cost associated with the first set of one or more virtual items may be reduced, in response to a determination that the second revenue generation rate for the first set of one or more virtual items is less than the first average revenue generate rate for the first set of one or more virtual items. The first user cost associated with the first set of one or more virtual items may be maintained, in response to a determination that the second revenue generation rate for the first set of one or more virtual items is greater than or the same as the first average revenue generate rate for the first set of one or more virtual items. Such operations may be performed by a cost adjustment module, such as cost adjustment module 114, in accordance with some implementations.

The specified threshold from the first average rate of purchase for the first set of one or more virtual items may be any threshold. For example the threshold may be two standard deviations from the average, such that in response to determining that the second rate of purchase for the first set of one or more virtual items is two standard deviations above the first average rate of purchase for the first set of one or more virtual items, the associated first user cost for the first set of one or more virtual items is increased, and in response to determining that the second rate of purchase for the first set of one or more virtual items is two standard deviations below the first average rate of purchase for the first set of one or more virtual items, the associated first user cost for the first set of one or more virtual items is decreased.

In some implementations of method 300, at additional or alternate operations, entry and/or selection by administrators of one or more rules for determining the average purchase rate of individual ones of the one or more sets of one or more virtual items may be facilitated. In other implementations entry and/or selection by administrators of an adjustment to the adjusted first associated user cost for the first set of one or more virtual items may be facilitated. For example, entry and/or selection of a maximum associated user cost for the sets of one or more virtual items may be facilitated. Such operations may be performed by an administrator module, such as administrator module 118, in accordance with some implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for adjusting the user cost associated with purchasable virtual items, the system comprising:
   one or more processors configured by machine-readable instructions to:
   execute an instance of a virtual space wherein the virtual space is a visual virtual space presented on client computing platforms associated with users via an interface, and using the instance of the virtual space to generate state information that is transmitted to the client computing platforms associated with the users over a network, the state information facilitating presentation of a view of the virtual space to the users via the client computing platforms, and to facilitate interaction of the users with the virtual space by executing actions in the instance of the virtual space in response to receiving action requests over the network from the client computing platforms associated with the users;
   facilitate presentation of a shop interface, wherein the shop interface includes a graphical user interface presented on the client computing platforms that presents offers to purchase sets of one or more virtual items to the user where individual ones of the sets of one or more virtual items has associated user costs, such that a first offer for a first set of one or more virtual items has a first associated user cost;
   obtain an average rate of purchase of individual ones of the sets of one or more virtual items by the users, wherein the average rate of purchase represents an average rate for a time period and individual rates of purchase represent rates for individual intervals of time within the time period that are shorter in duration than the time period, and wherein a first average rate of purchase by the users is obtained for the first set of one or more virtual items;

dynamically determine whether the rate of purchase is more than a specified threshold from the average rate of purchase of individual ones of the one or more sets of virtual items;

adjust the user cost associated with individual ones of the one or more sets of virtual items in response to a determination that the rate of purchase is more than a specified threshold from the average rate of purchase of individual ones of the one or more sets of virtual items, such that the first offer for the first set of one or more virtual items has an adjusted user cost associated in response to a determination that the rate of purchase for the first set of one or more virtual items is more than a specified threshold from the first average rate of purchase for the first set of one or more virtual items; and present, via the shop interface, the adjusted user cost for the first offer for the first set of the one or more sets of virtual items such that the shop interface presents the adjusted user cost in accordance with dynamic determinations of whether the rate of purchase is more than a specified threshold from the average rate of purchase of individual ones of the one or more sets of virtual items made by the one or more processors.

2. The system of claim 1, wherein the one or more processors are configured by machine-readable instructions to monitor the rate of purchase of sets of one or more virtual items during defined periodic time intervals, such that the rate of purchase of the first set of one or more virtual items is monitored during a first periodic time interval, and wherein the user cost associated with the first offer for the set first of one or more virtual items is adjusted responsive to a determination that the rate of purchase during the first periodic time interval is more than a specified threshold from the first average rate of purchase for the first set of one or more virtual items.

3. The system of claim 1, wherein the one or more processors are configured by machine-readable instructions to: obtain an average revenue generation rate for individual ones of the sets of one or more virtual items, such that a first average revenue generation rate is obtained for the first set of one or more virtual items; to determine a revenue generation rate from purchases of individual ones of the sets of one or more virtual items over a second period of time in response to an adjustment of the associated user cost for the individual ones of the sets of one or more virtual items, such that a second revenue generation rate is determined for the first set of one or more virtual items over the second period of time; and, compare the second revenue generation rate with the first average revenue generate rate for individual ones of the sets of one or more virtual items, such that the second revenue generation rate is compared with the first average revenue generation rate for the first set of one or more virtual items.

4. The system of claim 3, wherein the one or more processors are further configured by machine-readable instructions to adjust the first user cost associated with the first set of one or more virtual items in response to a determination that the first revenue generation rate for the first set of one or more virtual items is more than a specified threshold from the first average revenue generation rate for the first set of one or more virtual items.

5. The system of claim 4, wherein the one or more processors are configured by machine-readable instructions to reduce the first user cost associated with the first set of one or more virtual items, in response to a determination that the second revenue generation rate for the first set of one or more virtual items is less than the first average revenue generate rate for the first set of one or more virtual items, and to maintain the first user cost associated with the first set of one or more virtual items, in response to a determination that the second revenue generation rate for the first set of one or more virtual items is greater than or the same as the first average revenue generate rate for the first set of one or more virtual items.

6. The system of claim 1, wherein the specified threshold from the first average rate of purchase for the first set of one or more virtual items is two standard deviations from the average, such that in response to determining that the second rate of purchase for the first set of one or more virtual items is two standard deviations above the first average rate of purchase for the first set of one or more virtual items, the associated first user cost for the first set of one or more virtual items is increased, and in response to determining that the second rate of purchase for the first set of one or more virtual items is two standard deviations below the first average rate of purchase for the first set of one or more virtual items, the associated first user cost for the first set of one or more virtual items is decreased.

7. The system of claim 3, wherein the one or more processors are further configured by machine-readable instructions to obtain an average revenue generation rate for the first set of one or more virtual items, purchased by a first set of users comprising users having one or more like parameters, and the first user cost associated with the first set of one or more virtual items for the first set of users is adjusted in response to determining the revenue generation rate for the first set of one or more virtual items purchased by the first set of users.

8. The system of claim 1, wherein the one or more processors are configured by machine-readable instructions to facilitate entry and/or selection by administrators of one or more rules for determining the average purchase rate of individual ones of the one or more sets of one or more virtual items.

9. The system of claim 1, wherein the one or more processors are configured by machine-readable instructions to facilitate entry and/or selection by administrators of an adjustment to the adjusted first associated user cost for the first set of one or more virtual items.

10. The system of claim 9, wherein the one or more processors are configured by machine-readable instructions to facilitate entry and/or selection of a maximum associated user cost for the sets of one or more virtual items.

11. A method for adjusting the user cost associated with purchasable virtual items, the method implemented on a computer system that includes one or more processors, the method comprising:

executing an instance of a virtual space, wherein the virtual space is a visual virtual space presented on client computing platforms associated with users via an interface;

generating state information using the instance of the virtual space, wherein the state information that is transmitted to the client computing platforms associated with the users over a network the state information facilitating presentation of a view of the virtual space to users;

facilitating interaction of the users with the virtual space by executing actions in the instance of the virtual space in response to receiving action requests over the network from the client computing platforms associated with the users;

facilitating presentation of a shop interface, wherein the shop interface includes a graphical user interface presented on the client computing platforms that presents offers to purchase sets of one or more virtual items to the user where individual ones of the sets of one or more virtual items has associated user costs, such that a first offer for a first set of one or more virtual items has a first associated user cost;

obtaining an average rate of purchase of individual ones of the sets of one or more virtual items by the users, wherein the average rate of purchase represents an average rate for a time period and individual rates of purchase represent rates for individual intervals of time within the time period that are shorter in duration than the time period, and wherein a first average rate of purchase by the users is obtained for the first set of one or more virtual items;

dynamically determining whether the rate of purchase is more than a specified threshold from the average rate of purchase of individual ones of the one or more sets of virtual items;

adjusting the user cost associated with individual ones of the one or more sets of virtual items in response to a determination that the rate of purchase is more than a specified threshold from the average rate of purchase of individual ones of the one or more sets of virtual items, such that the first offer for the first set of one or more virtual items has an adjusted user cost associated in response to a determination that the rate of purchase for the first set of one or more virtual items is more than a specified threshold from the first average rate of purchase for the first set of one or more virtual items; and presenting, via the shop interface, the adjusted user cost for the first offer for the first set of the one or more sets of virtual items such that the shop interface presents the adjusted user cost in accordance with dynamic determinations of whether the rate of purchase is more than a specified threshold from the average rate of purchase of individual ones of the one or more sets of virtual items made by the one or more processors.

12. The method of claim 11, further comprising:

monitoring the rate of purchase of sets of one or more virtual items during defined periodic time intervals, such that the rate of purchase of the first set of one or more virtual items is monitored during a first periodic time interval; and adjusting the user cost associated with the first offer for the set first of one or more virtual items upon a determination that the rate of purchase during the first periodic time interval is more than a specified threshold from the first average rate of purchase for the first set of one or more virtual items.

13. The method of claim 11, further comprising:

obtaining an average revenue generation rate for individual ones of the sets of one or more virtual items, such that a first average revenue generation rate is obtained for the first set of one or more virtual items;

determining a revenue generation rate from purchases of individual ones of the sets of one or more virtual items over a second period of time in response to an adjustment of the associated user cost for the individual ones of the sets of one or more virtual items, such that a second revenue generation rate is determined for the first set of one or more virtual items over the second period of time; and, comparing the second revenue generation rate with the first average revenue generate rate for individual ones of the sets of one or more virtual items, such that the second revenue generation rate is compared with the first average revenue generation rate for the first set of one or more virtual items.

14. The method of claim 13, further comprising adjusting the first user cost associated with the first set of one or more virtual items in response to a determination that the first revenue generation rate for the first set of one or more virtual items is more than a specified threshold from the first average revenue generation rate for the first set of one or more virtual items.

15. The method of claim 14, further comprising reducing the first user cost associated with the first set of one or more virtual items, in response to a determination that the second revenue generation rate for the first set of one or more virtual items is less than the first average revenue generate rate for the first set of one or more virtual items, and maintaining the first user cost associated with the first set of one or more virtual items, in response to a determination that the second revenue generation rate for the first set of one or more virtual items is greater than or the same as the first average revenue generate rate for the first set of one or more virtual items.

16. The method of claim 11, wherein the specified threshold from the first average rate of purchase for the first set of one or more virtual items is two standard deviations from the average, such that in response to determining that the second rate of purchase for the first set of one or more virtual items is two standard deviations above the first average rate of purchase for the first set of one or more virtual items, the associated first user cost for the first set of one or more virtual items is increased, and in response to determining that the second rate of purchase for the first set of one or more virtual items is two standard deviations below the first average rate of purchase for the first set of one or more virtual items, the associated first user cost for the first set of one or more virtual items is decreased.

17. The method of claim 13, further comprising obtaining an average revenue generation rate for the first set of one or more virtual items, purchased by a first set of users comprising users having one or more like parameters, and adjusting the first user cost associated with the first set of one or more virtual items for the first set of users in response to determining the revenue generation rate for the first set of one or more virtual items purchased by the first set of users.

18. The method of claim 11, further comprising facilitating entry and/or selection by administrators of one or more rules for determining the average purchase rate of individual ones of the one or more sets of one or more virtual items.

19. The method of claim 11, further comprising facilitating entry and/or selection by administrators of an adjustment to the adjusted first associated user cost for the first set of one or more virtual items.

20. The method of claim 19, further comprising facilitating entry and/or selection of a maximum associated user cost for the sets of one or more virtual items.

* * * * *